US012627101B2

(12) United States Patent
Saito et al.

(10) Patent No.: US 12,627,101 B2
(45) Date of Patent: May 12, 2026

(54) LEVER-TYPE CONNECTOR

(71) Applicant: SUMITOMO WIRING SYSTEMS, LTD., Mie (JP)

(72) Inventors: Sho Saito, Mie (JP); Yuki Kondo, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 283 days.

(21) Appl. No.: 18/282,484

(22) PCT Filed: Mar. 4, 2022

(86) PCT No.: PCT/JP2022/009336
§ 371 (c)(1),
(2) Date: Sep. 15, 2023

(87) PCT Pub. No.: WO2022/202211
PCT Pub. Date: Sep. 29, 2022

(65) Prior Publication Data
US 2024/0162659 A1 May 16, 2024

(30) Foreign Application Priority Data
Mar. 23, 2021 (JP) ................................ 2021-048360

(51) Int. Cl.
*H01R 13/641* (2006.01)
*H01R 13/629* (2006.01)

(52) U.S. Cl.
CPC ..... *H01R 13/641* (2013.01); *H01R 13/62933* (2013.01)

(58) Field of Classification Search
CPC ........................ H01R 13/641; H01R 13/62933
USPC .......................................................... 439/345
See application file for complete search history.

(56) References Cited

U.S. PATENT DOCUMENTS 4,811,002 A 3/1989 Otsubo
9,583,860 B1 2/2017 DeWitte
2015/0318640 A1* 11/2015 Gibeau ................ H01R 13/641 439/489
2017/0229813 A1 8/2017 Exenberger et al.
(Continued)

FOREIGN PATENT DOCUMENTS

DE 102021000345.4 * 1/2021
JP 2006-351275 A 12/2006

OTHER PUBLICATIONS

International Search Report issued on Apr. 12, 2022 for WO 2022/202211 A1 (4 pages).

*Primary Examiner* — Tulsidas C Patel
*Assistant Examiner* — Thaslimur Rahman
(74) *Attorney, Agent, or Firm* — Venjuris, P.C.

(57) ABSTRACT

A lever-type connector 1 includes: a connector housing 10; a lever 30; a CPA holding portion 21 that is provided on one of the connector housing 10 and the lever 30 and has a first code arrangement surface 22S1; a CPA member 40 that is attached to the CPA holding portion 21, is displaceable from a standby position to a fitting assurance position when the lever 30 is at a fitting assurance position, and is arranged on the same plane as the first code arrangement surface 41S1 when the lever 30 is at the fitting assurance position; a first divided code arranged on the first code arrangement surface 22S1; and a second divided code 50B arranged on the second code arrangement surface 41S1.

8 Claims, 20 Drawing Sheets

(56) References Cited

U.S. PATENT DOCUMENTS

| | | | |
|---|---|---|---|
| 2019/0372262 A1 | 12/2019 | Christiano et al. | |
| 2021/0111519 A1 | 4/2021 | Schneider et al. | |
| 2023/0352879 A1* | 11/2023 | Scherer ................ | H01R 13/641 |

* cited by examiner

LEVER-TYPE CONNECTOR

CROSS REFERENCE TO RELATED APPLICATIONS

This application is a national phase of PCT application No. PCT/JP2022/009336, filed on 4 Mar. 2022, which claims priority from Japanese patent application No. 2021-048360, filed on 23 Mar. 2021, all of which are incorporated herein by reference.

TECHNICAL FIELD

The technique disclosed by the present specification relates to a lever-type connector.

BACKGROUND

Conventionally, a connector is known that has a fitting detection function for detecting whether or not a male housing and a female housing are properly fitted with each other. As such a connector, a connector has been proposed in which marks composed of a plurality of linear protrusions and recesses are disposed on the surfaces of the male housing and the female housing, respectively. The surface of each protrusion is polished to have a different light reflectance from the other surfaces of the housing. After the male housing and the female housing are fitted together, the light sensor detects reflected light from each protrusion. By analyzing the data of the detected reflected light, it is determined whether or not the two housings are properly fitted together (see Patent Document 1).

PRIOR ART DOCUMENT

Patent Document

Patent Document 1: JP S63-225480 A

SUMMARY OF THE INVENTION

Problems to be Solved

It is conceivable to record that the two connectors are properly fitted together by reading, with a reading device, the marks provided on the two connectors to be fitted to each other using the above configuration. However, in the above configuration, there is concern that the acquired data of the reflected light from the protrusions will become unstable due to manufacturing tolerances in the shapes of the protrusions, molding defects during manufacturing, chipping of the protrusions after manufacturing, rattling that occurs when fitting together the housings, and the like.

Means to Solve the Problem

The lever-type connector disclosed by this specification includes: a connector housing capable of fitting with a partner connector; a lever configured to be attached so as to be rotatable from a fitting start position to a fitting completion position with respect to the connector housing; a holding portion provided on one of the connector housing and the lever and having a first code arrangement surface; a fitting assurance member that is attached to the holding portion, is displaceable from a standby position to a fitting assurance position when the lever is at the fitting completion position, and has a second code arrangement surface arranged on the same plane as the first code arrangement surface when the lever is at the fitting assurance position; a first divided code arranged on the first code arrangement surface; and a second divided code arranged on the second code arrangement surface, in which when the fitting assurance member is at the fitting assurance position, the first divided code and the second divided code are adjacent to each other and form a two-dimensional code.

According to the above configuration, the two-dimensional code can be read when the fitting assurance member is at the fitting assurance position, and therefore it is possible to accurately record that the lever-type connector has been properly fitted with a partner connector.

Effect of the Invention

According to the lever-type connector disclosed by this specification, it is possible to accurately record that the lever-type connector has been properly fitted with the partner connector.

DETAILED DESCRIPTION TO EXECUTE THE INVENTION

Figure 1:
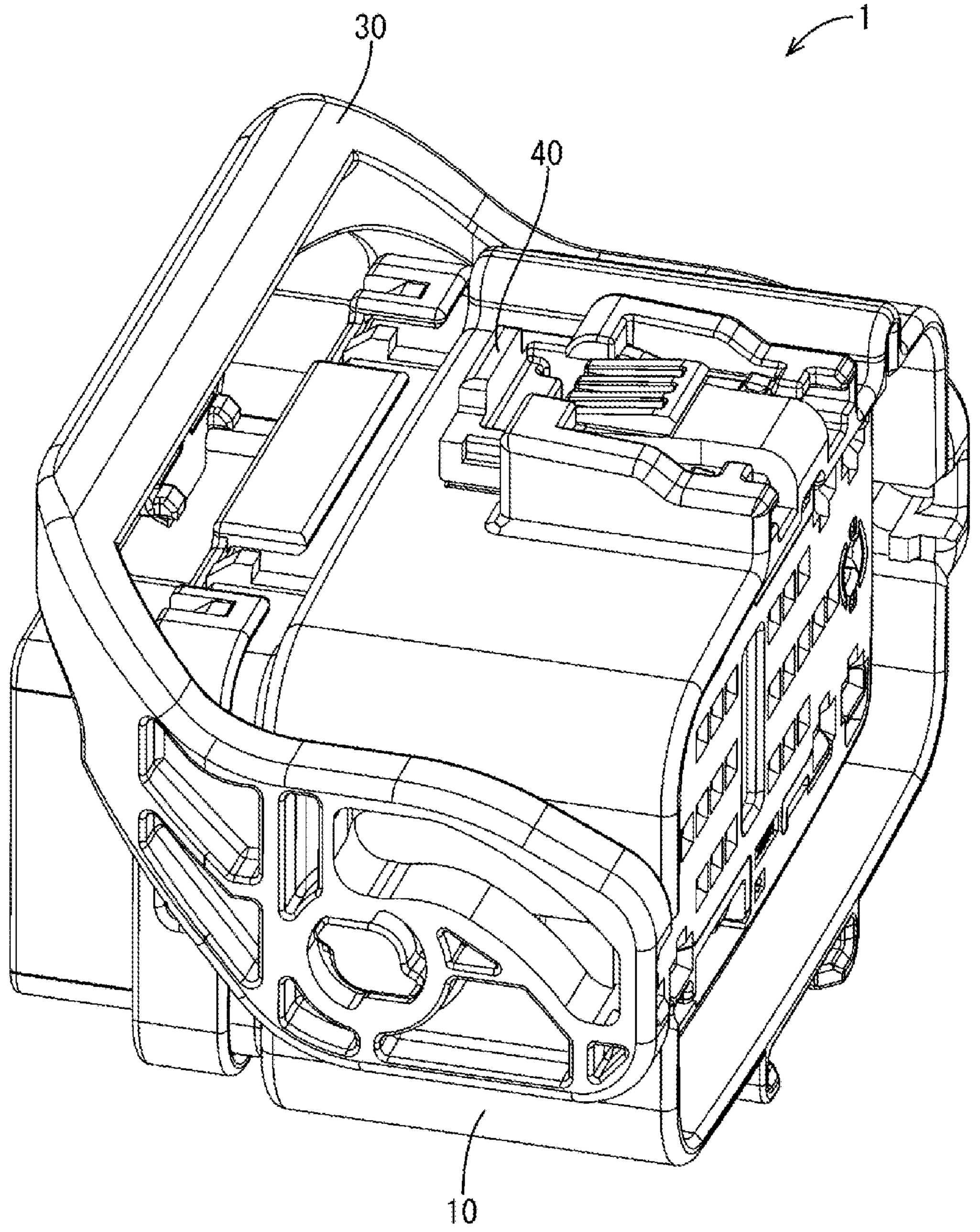
FIG. 1 is a perspective view of a lever-type connector of an embodiment.

Overview of Embodiment (1) The lever-type connector disclosed by this specification includes: a connector housing capable of fitting with a partner connector; a lever configured to be attached so as to be rotatable from a fitting start position to a fitting completion position with respect to the connector housing; a holding portion provided on one of the connector housing and the lever and having a first code arrangement surface; a fitting assurance member that is attached to the holding portion, is displaceable from a standby position to a fitting assurance position when the lever is at the fitting completion position, and has a second code arrangement surface arranged on the same plane as the first code arrangement surface when the lever is at the fitting assurance position; a first divided code arranged on the first code arrangement surface; and a second divided code arranged on the second code arrangement surface, in which when the fitting assurance member is at the fitting assurance position, the first divided code and the second divided code are adjacent to each other and form a two-dimensional code.

According to the above configuration, the two-dimensional code can be read when the fitting assurance member is at the fitting assurance position, and therefore it is possible to accurately record that the lever-type connector has been properly fitted with a partner connector.

(2) In the lever-type connector of (1) above, both the first code arrangement surface and the second code arrangement surface may also be surfaces visible from the outside in both a state where the fitting assurance member is at the standby position and a state where the fitting assurance member is at the fitting assurance position.

According to such a configuration, the first divided code arranged on the first code arrangement surface and the second divided code arranged on the second code arrangement surface are always visible, and therefore, by visually confirming whether or not the positions of the first divided code and the second divided code are shifted from each other, it is possible to determine whether or not the fitting between the lever-type connector and the partner connector is complete, and the task of fitting the lever-type connector and the partner connector can be performed more smoothly.

(3) In the lever-type connector of (1) or (2) above, one of the holding portion and the fitting assurance member may also include a restricting portion, and the other may also include a restriction receiving portion for restricting displacement of the engagement assurance member from the fitting assurance position to the standby position by engaging with the restricting portion.

According to such a configuration, it is possible to prevent the fitting assurance member from rattling in the direction of moving to the standby position with respect to the holding portion, and to prevent misalignment between the first divided code and the second divided code. This avoids a situation in which the two-dimensional code cannot be read even though the lever is at a fitting completion position.

(4) In the lever-type connector according to any one of (1) to (3) above, the holding portion may also include a first corner portion formed by the first code arrangement surface and a first opposing surface adjacent to the first code arrangement surface, the first corner portion having an angular shape, and the fitting assurance member may also include a second corner portion formed by the second code arrangement surface and a second opposing surface that is adjacent to the second code arrangement surface and is configured to come into contact with the first opposing surface when the fitting assurance member is at the fitting assurance position, the second corner portion having an angular shape.

According to such a configuration, when the fitting assurance member is at the fitting assurance position, the first code arrangement surface and the second code arrangement surface are adjacent to each other without any gap, and therefore the first divided code and the second divided code being adjacent to each other without any gap and form the two-dimensional code. This makes it possible to reliably read the two-dimensional code.

Detailed Embodiments

A specific example of the technique disclosed in this specification will be described below with reference to the drawings. Note that the present invention is not limited to these illustrations, but is indicated by the scope of the claims, and all modifications within the scope and meaning equivalent to the scope of the claims are intended to be encompassed therein.

Embodiment

Figure 5:
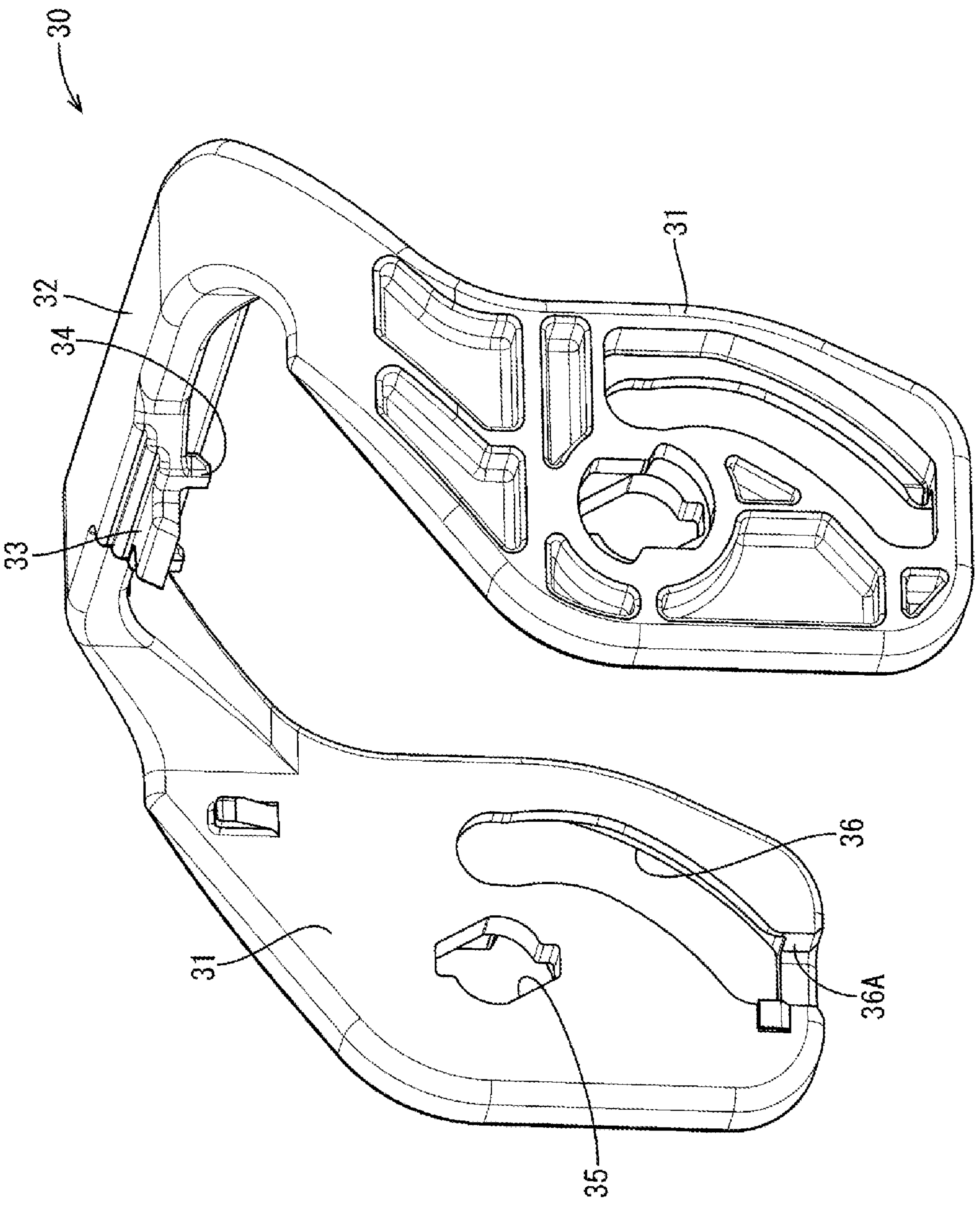
FIG. 5 is a perspective view of a lever of the embodiment.
Figure 6:
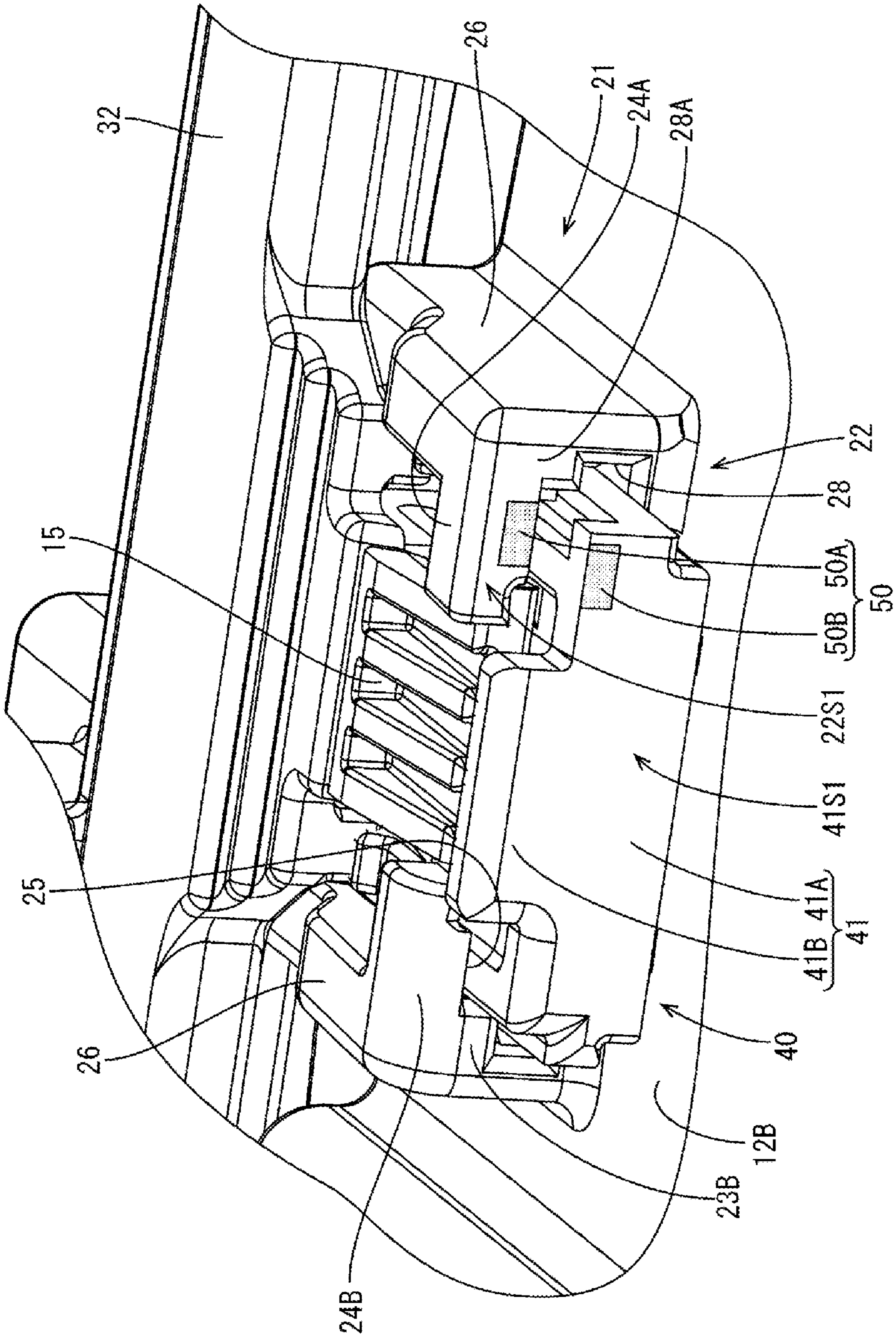
FIG. 6 is a partially-enlarged perspective view showing a CPA holding portion of the embodiment and a CPA member held at a standby position.
Figure 7:
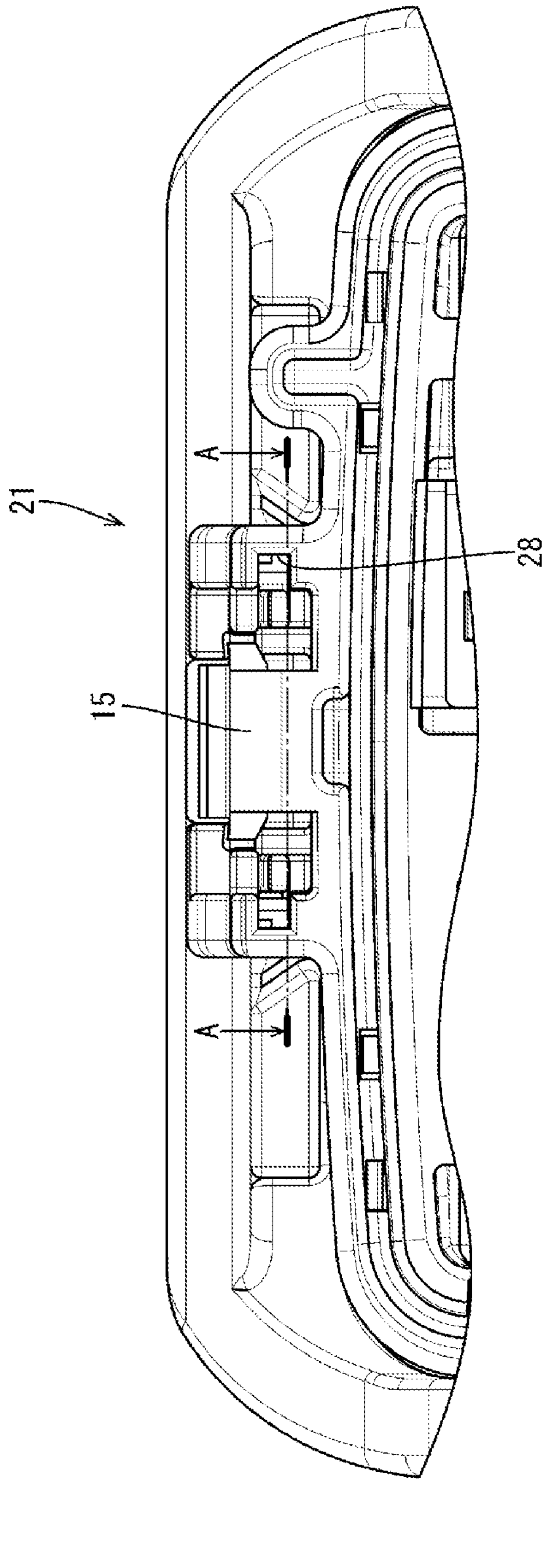
FIG. 7 is a partially-enlarged front view showing the CPA holding portion of the embodiment and the CPA member held at the standby position.

An embodiment will be described with reference to FIGS. 1 to 20. A lever-type connector 1 of the present embodiment is a connector that fits with a partner connector 60 having cam followers 64, and as shown in FIGS. 1 and 6, includes a connector housing 10 having a CPA holding portion 21 (an example of a holding portion), a lever 30 attached to the connector housing 10, and a CPA (connector position assurance) member 40 (an example of a fitting assurance member) that is attached to the CPA holding portion 21 to assure the fitting state between the lever-type connector 1 and the partner connector 60. The CPA member 40 can slide between a standby position (position shown in FIGS. 1, 6, 10, 13, 14 and 15) where part of the CPA member 40 protrudes from the CPA holding portion 21, and a fitting assurance position (position shown in FIGS. 18 and 19) where the entirety of the CPA member 40 is accommodated in the CPA holding portion 21. Note that in FIGS. 10 and 18, the CPA member 40 is shaded to make the drawings easier to see.

Connector Housing 10

Figure 2:
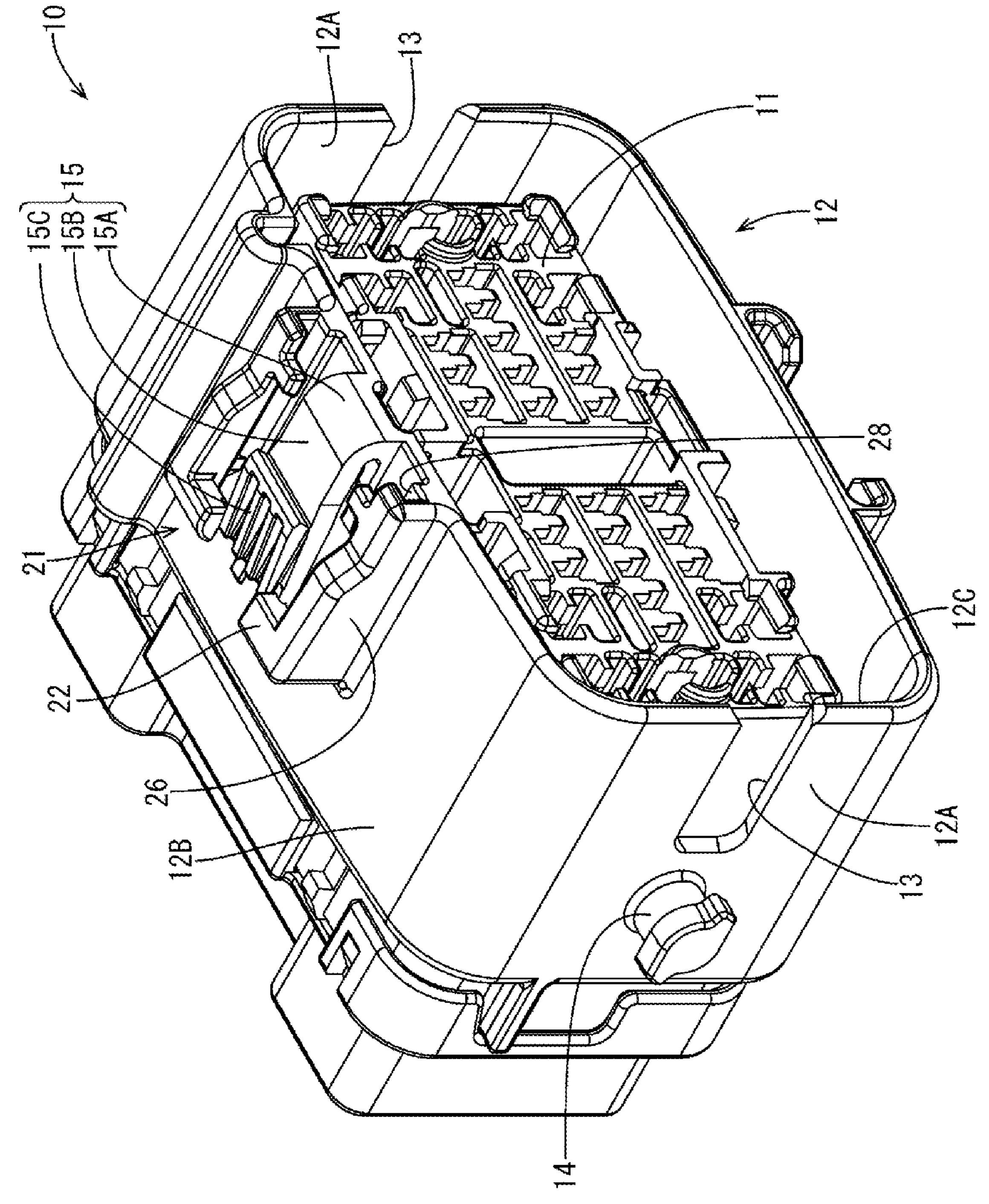
FIG. 2 is a perspective view of a connector housing of the embodiment.
Figure 3:
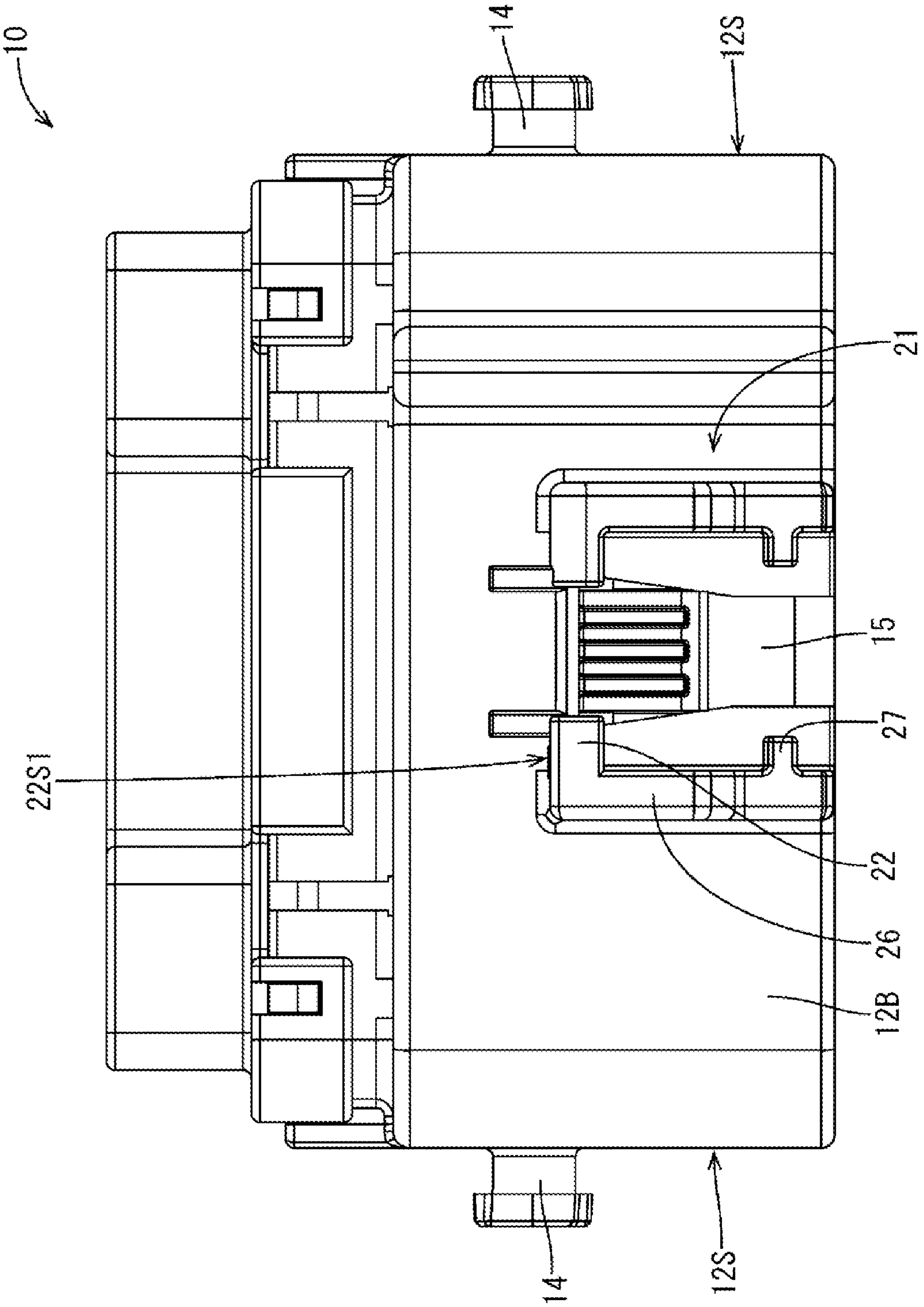
FIG. 3 is a plan view of the connector housing of the embodiment.
Figure 4:
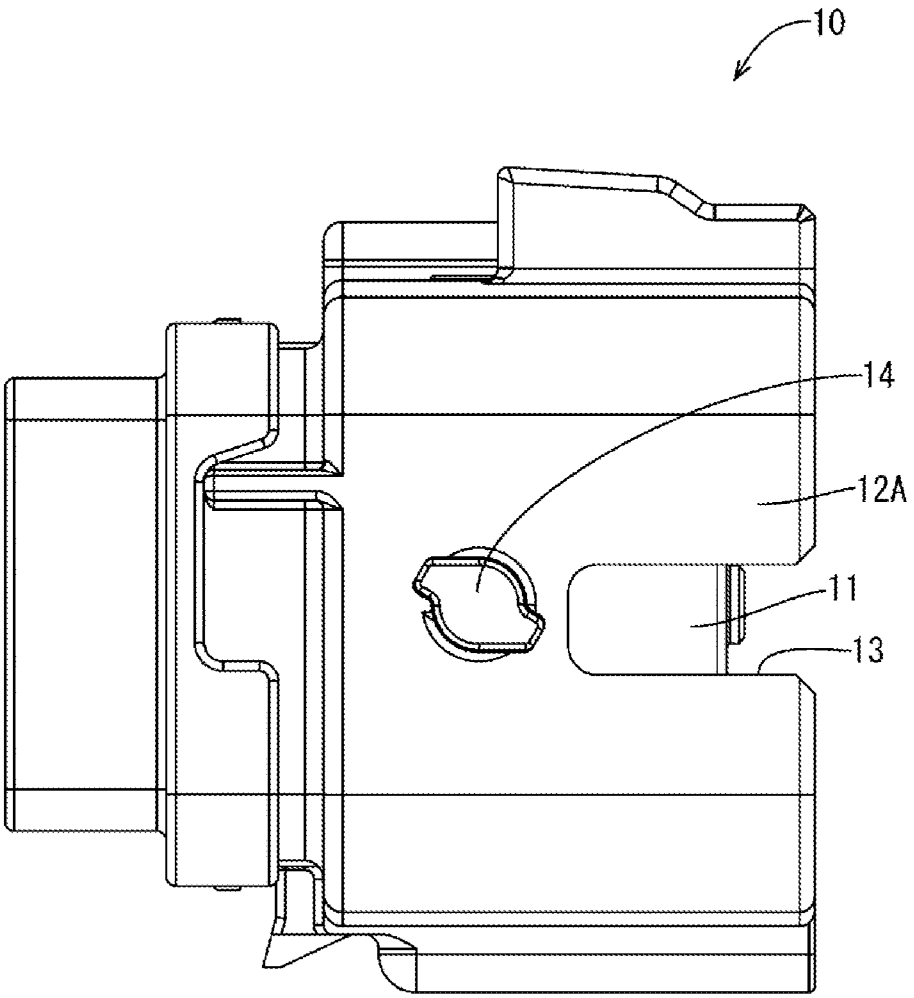
FIG. 4 is a side view of the connector housing of the embodiment.

The connector housing 10 is made of synthetic resin and, as shown in FIGS. 2, 3, and 4, includes a block-shaped first terminal holding portion 11 for holding terminal fittings, a rectangular tube-shaped first hood portion 12 that is arranged surrounding the first terminal holding portion 11 and inside of which the partner connector 60 is to be received, two rotation shafts 14, and a lock arm 15.

As shown in FIG. 2, the first hood portion 12 includes two attachment walls 12A that are arranged on both sides of the first terminal holding portion 11 and are parallel to each other, and a lock wall 12B that connects the two attachment walls 12A. The outer surfaces of the two attachment walls 12A are each an attachment surface 12S for the lever 30, as shown in FIG. 3. The first hood portion 12 has a connector entry port 12C into which the partner connector 60 can enter, as shown in FIG. 2. As shown in FIGS. 2 and 4, the two attachment walls 12A each have a receiving groove 13 that extends from the edge of the connector entry port 12C and through which the corresponding cam follower 64 of the partner connector 60 is inserted. As shown in FIG. 3, the two rotation shafts 14 each have a substantially cylindrical shape and are respectively arranged on the two attachment surfaces 12S.

As shown in FIG. 2, the lock arm 15 includes a lock base portion 15A extending from the outer surface of the lock wall 12B, a plate-spring-shaped lock plate 15B that is connected to the lock base portion 15A and extends along the lock wall 12B, and a lock claw 15C that extends in the direction opposite to the lock wall 12B from the lock plate 15B. The lock plate 15B has one end connected to the lock base portion 15A as a base end and the other end as a free end, and can be bent in a direction toward or away from the lock wall 12B.

Lever 30

The lever 30 is a member for assisting fitting and disengagement with the partner connector 60 using the principle of a lever. The lever 30 is made of synthetic resin and, as shown in FIG. 5, is a substantially U-shaped member including two cam plates 31 and a rotation operation portion 32 connecting the two cam plates 31.

Each cam plate 31 has a thick plate-like shape and has a shaft hole 35 for receiving the corresponding rotation shaft 14 and a cam groove 36 for receiving the corresponding cam follower 64. The shaft hole 35 is a substantially circular hole passing through the cam plate 31. The cam groove 36 has a cam entry port 36A at one edge of the cam plate 31 to allow entry of the cam follower 64, and extends inward from the cam entry port 36A. The cam groove 36 has a substantially arcuate shape such that it gradually approaches the shaft hole 35, which is the center of rotation of the cam plate 31, as it extends inward from the cam entry port 36A.

The lever 30 has a lock portion 33 and two release protrusions 34. The lock portion 33 protrudes from the rotation operation portion 32 and has a plate shape that tapers away from the rotation operation portion 32. The two release protrusions 34 respectively extend from the two side edges of the locking portion 33.

The lever 30 is attached so as to straddle the connector housing 10, the cam plates 31 are arranged along the respective attachment surfaces 12S, and the rotation shafts 14 are fitted in the respective shaft holes 35. The lever 30 is supported by the rotation shafts 14 so as to be able to rotate using the rotation shaft 14 as a rotation center, between a fitting start position (the position shown in FIGS. 1 and 13) and a fitting completion position (the position shown in FIG. 14) in a state where the partner connector 60 is fitted with the connector housing 10 at a proper fitting position.

CPA Holding Portion 21

As shown in FIGS. 2, 3, and 6, the CPA holding portion 21 is arranged on the outer surface of the lock wall 12B and surrounds the free end side and both sides of the lock arm 15. As shown in FIGS. 2 and 3, the CPA holding portion 21 includes an insertion wall portion 22 arranged on the free end side of the lock arm 15, two side walls 26 that extend from the insertion wall portion 22 and are arranged on both sides of the lock arm 15, and two first restricting protrusions 27 (examples of restricting portions) extending from the two side walls 26.

As shown in FIG. 6, the insertion wall portion 22 includes a first standing wall 23A and a second standing wall 23B respectively arranged on both sides of the free end of the lock arm 15, a first restricting wall 24A that extends from the leading end portion of the first standing wall 23A toward the second standing wall 23B, and a second restricting wall 24B extending from the leading end of the second standing wall 23B toward the first standing wall 23A. The outer surface of the insertion wall portion 22 perpendicular to the lock wall 12B is a first code arrangement surface 22S1, as shown in FIGS. 3 and 6. The first code arrangement surface 22S1 is a surface that can be viewed from the outside in both the state where the CPA member 40 is at the standby position and the state where the CPA member 40 is at the fitting assurance position. A space defined by the insertion wall portion 22 and the lock wall 12B is, as shown in FIG. 6, a CPA insertion port 25 that is open in the first code arrangement surface 22S1 and allows entry of the CPA member 40 into the CPA holding portion 21.

The two side walls 26 respectively extend from the insertion wall portion 22 along the two side edges of the lock arm 15, as shown in FIG. 3.

As shown in FIG. 3, the two first restricting protrusions 27 are respectively arranged near the ends of the two side walls 26 opposite to the insertion wall portion 22 and are spaced apart from the lock wall 12B.

Figure 8:
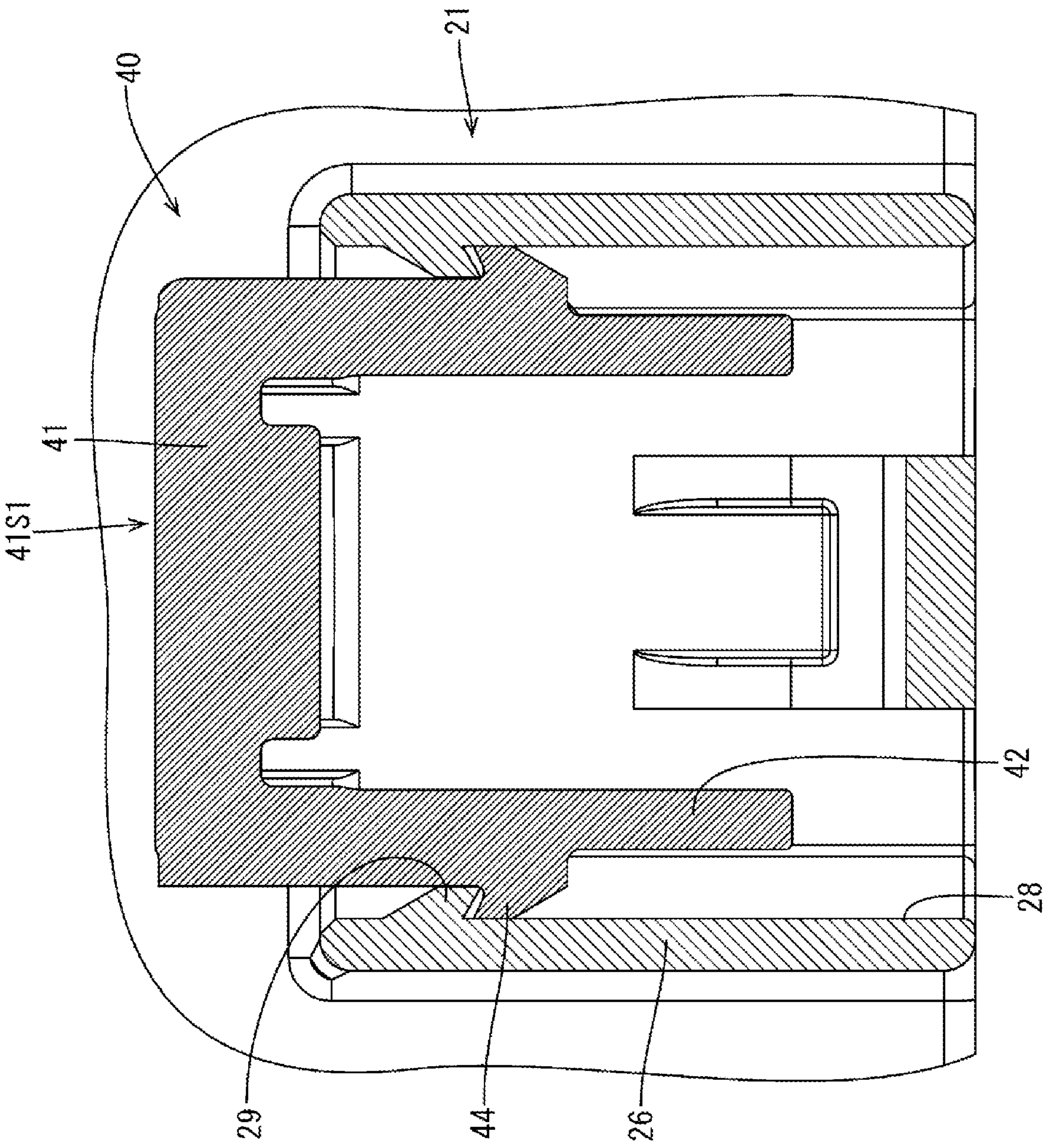
FIG. 8 is a cross-sectional view taken along line A-A of FIG. 7.

The CPA holding portion 21 has two guide grooves 28 extending along the side edges of the lock arm 15, as shown in FIGS. 2 and 6. A first locking protrusion 29 protrudes inside the guide groove 28, as shown in FIG. 8.

CPA Member 40

Figure 9:
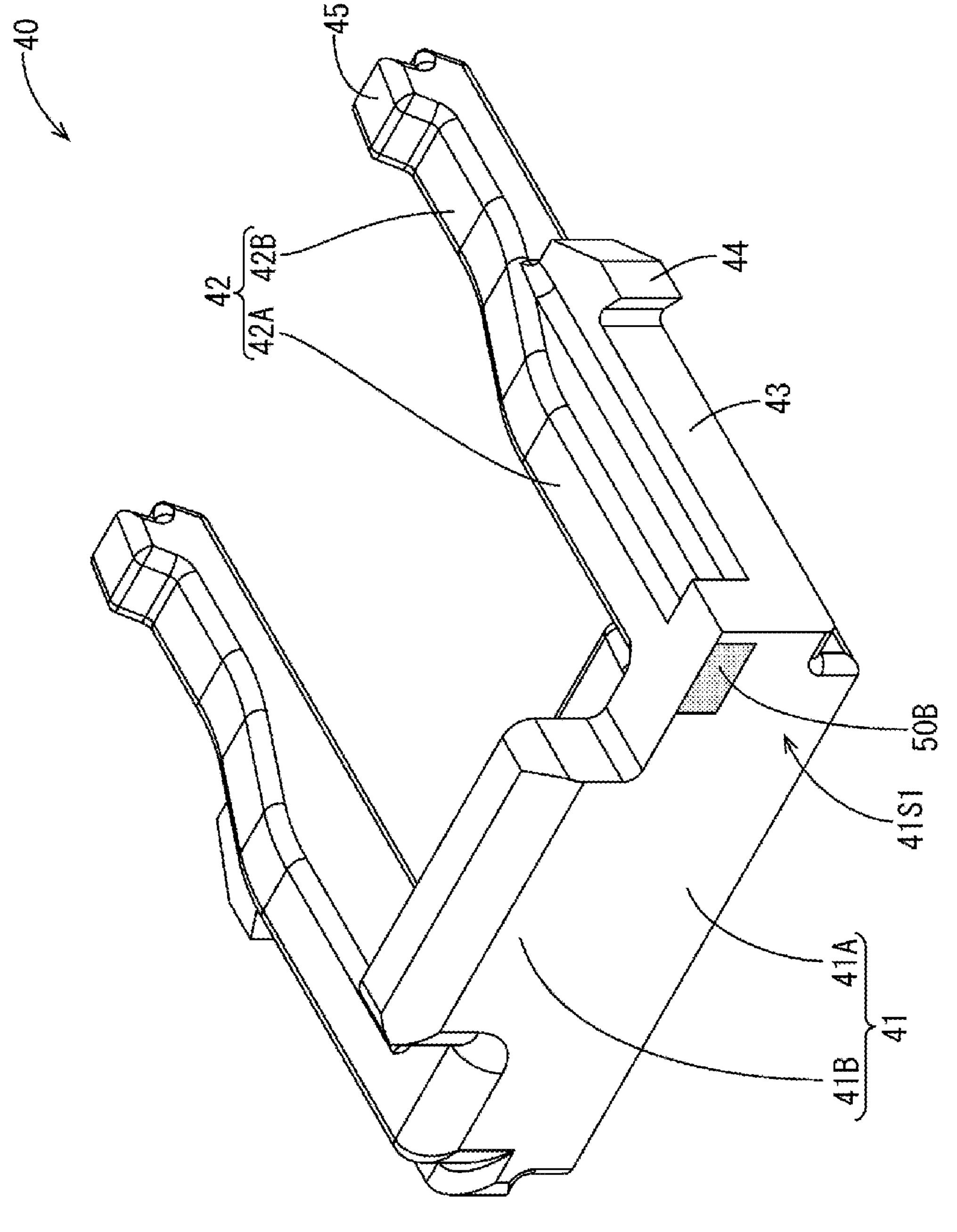
FIG. 9 is a perspective view of the CPA member of the embodiment.

As shown in FIG. 9, the CPA member 40 includes a push-in operation portion 41, two arms 42 respectively extending from both ends of the push-in operation portion 41, guide ribs 43 protruding from each of the two arms 42, second locking protrusions 44, and second restricting protrusions 45 (examples of restriction receiving portions).

The push-in operation portion 41 has a thick plate shape, and includes a push-in base portion 41A arranged along the lock wall 12B and a protruding portion 41B protruding from the push-in base portion 41A. The protruding portion 41B has a plate shape and protrudes from the push-in base portion 41A in the direction opposite to the lock wall 12B. The outer surface of the push-in operation portion 41 has a second code arrangement surface 41S1 perpendicular to the lock wall 12B. The second code arrangement surface 41S1 is a surface that is visible from the outside in both the state where the CPA member 40 is at the standby position and the state where the CPA member 40 is at the engagement assurance position.

The two arms 42 are respectively arranged at both ends of the push-in operation portion 41 and extend from the surface opposite to the second code arrangement surface 41S1. The two arms 42 are respectively arranged between the two side walls 26 and the locking arm 15.

Each arm 42 has a rod shape overall, and the half thereof adjacent to the push-in operation part 41 is an arm base portion 42A, and the half thereof on the leading end side relative to the arm base portion 42A is a bending portion 42B that is thinner than the arm base portion 42A and is allowed to undergo a bending deformation. The guide rib 43 has a strip shape, protrudes from the surface of the arm base 42A facing the side wall 26, and can be accommodated inside the guide groove 28. The second locking protrusion 44 is a protrusion further protruding in the width direction from the guide rib 43, is arranged inside the guide groove 28, and is engageable with the first locking protrusion 29. The second restricting protrusion 45 is arranged at the leading end portion of the arm 42, protrudes upward in the direction opposite to the lock wall 12B, and is engageable with the first restricting protrusion 27.

Figure 10:
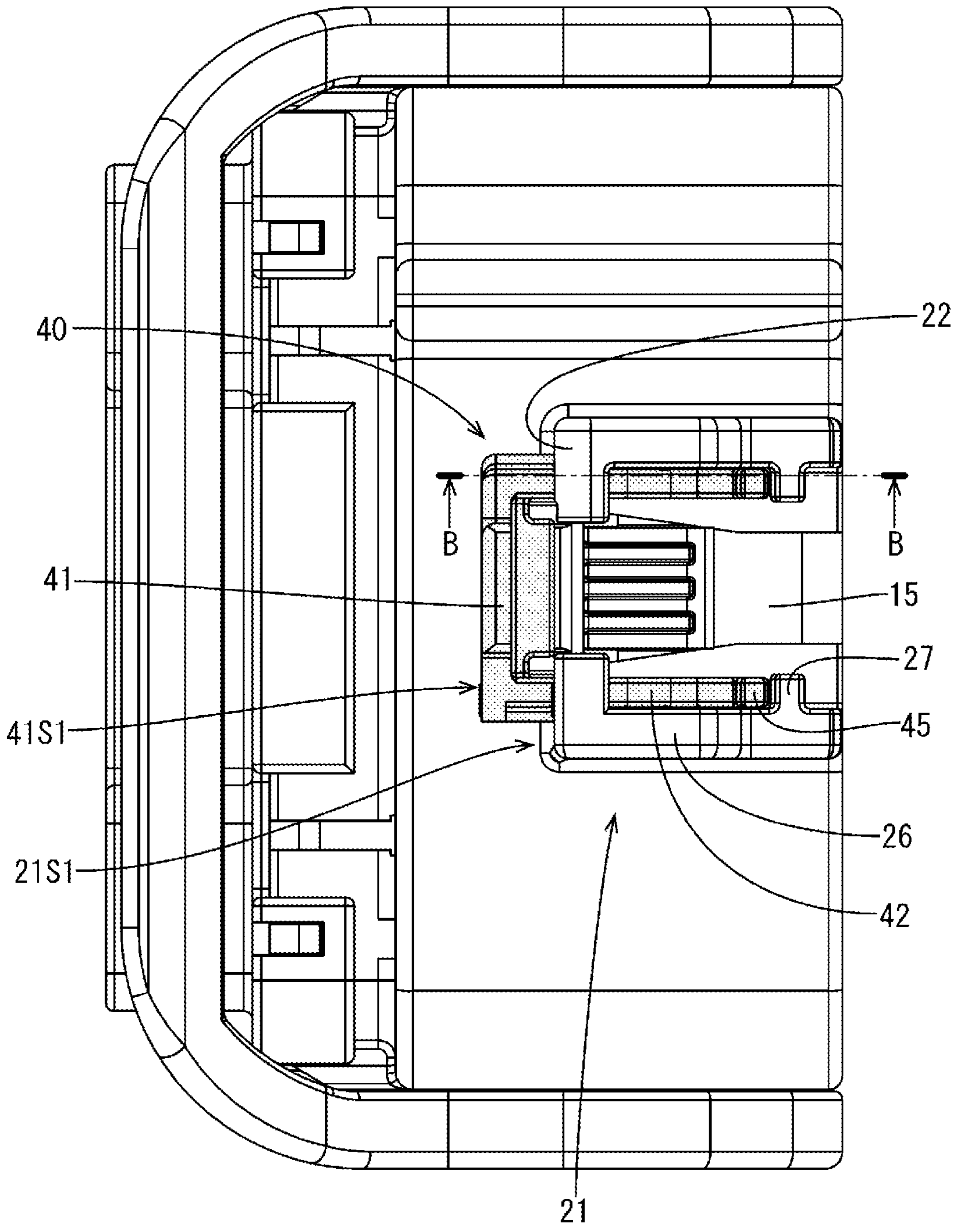
FIG. 10 is a plan view of the lever-type connector of the embodiment.
Figure 11:
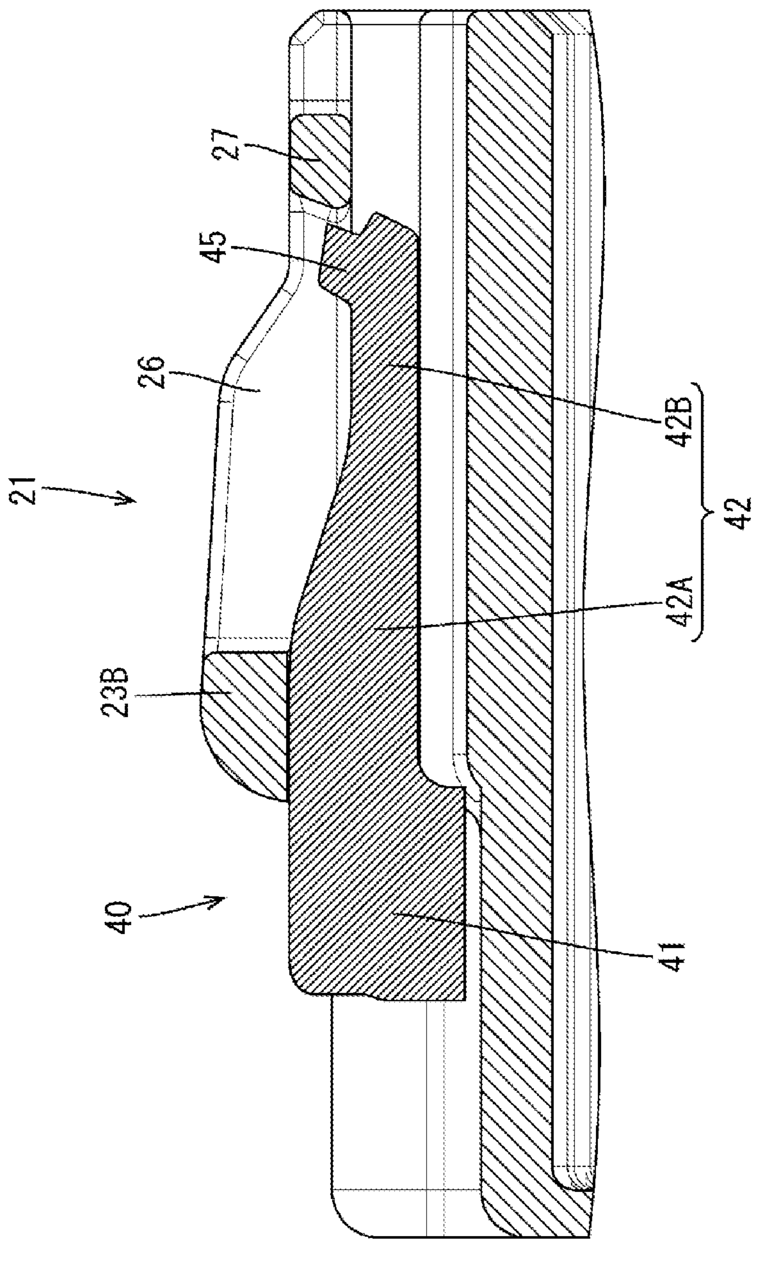
FIG. 11 is a cross-sectional view taken along line B-B of FIG. 10.

When the CPA member 40 is at the standby position, as shown in FIGS. 6 and 10, the entire push-in operation portion 41 and parts of the arms 42 protrude outside relative to the first code arrangement surface 22S1. As shown in FIG. 8, when the CPA member 40 protrudes from the CPA holding portion 21 by a certain amount or more, the second locking protrusions 44 engage with the first locking protrusions 29 and restrict the CPA member 40 from falling off of the CPA holding portion 21. As shown in FIGS. 10 and 11, the second restricting protrusion 45 engages with the first restricting protrusion 27 to restrict the CPA member 40 from being displaced to the fitting assurance position.

Figure 18:
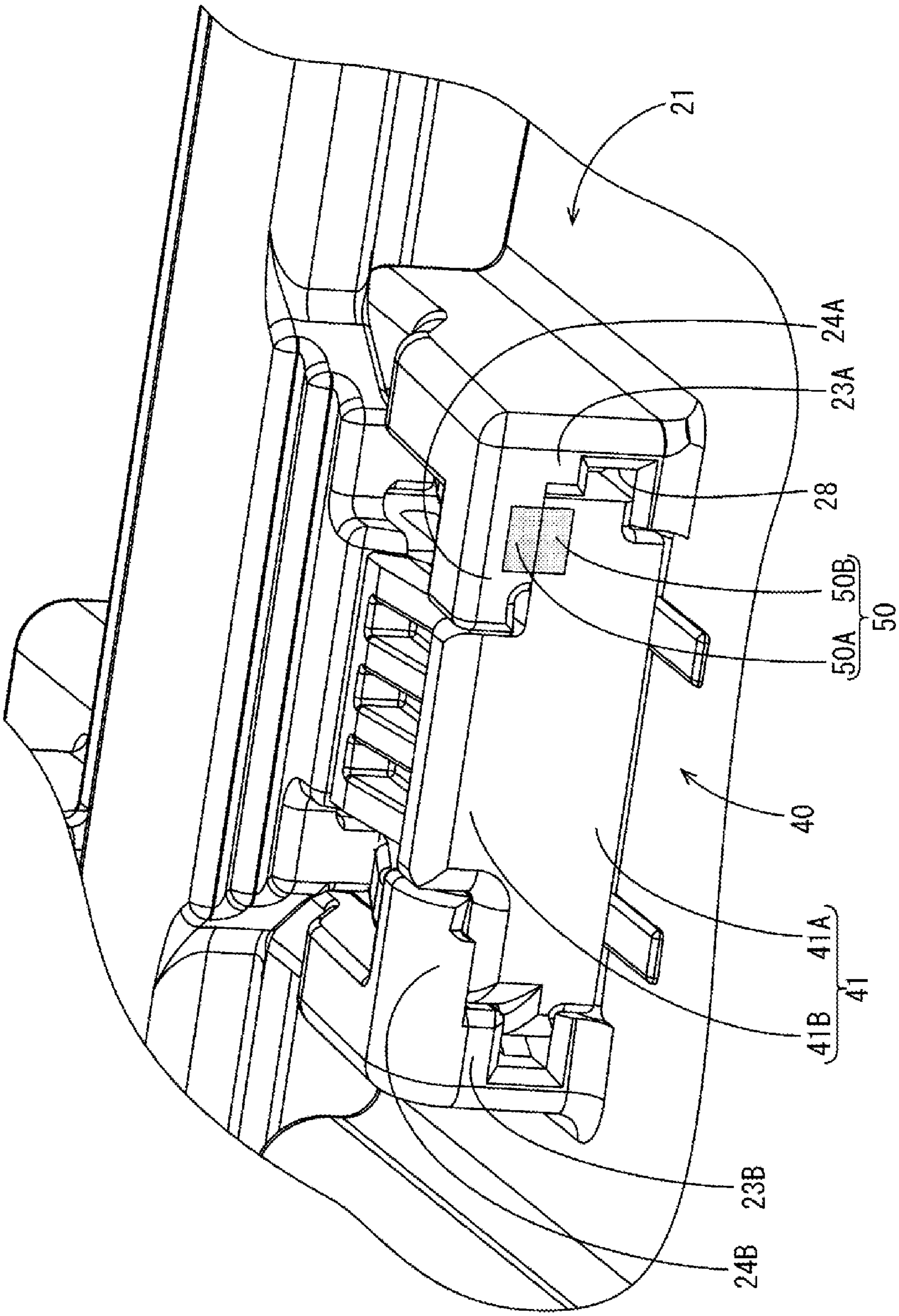
FIG. 18 is a partially enlarged perspective view showing a state where the CPA member of the embodiment is at a fitting assurance position.
Figure 19:
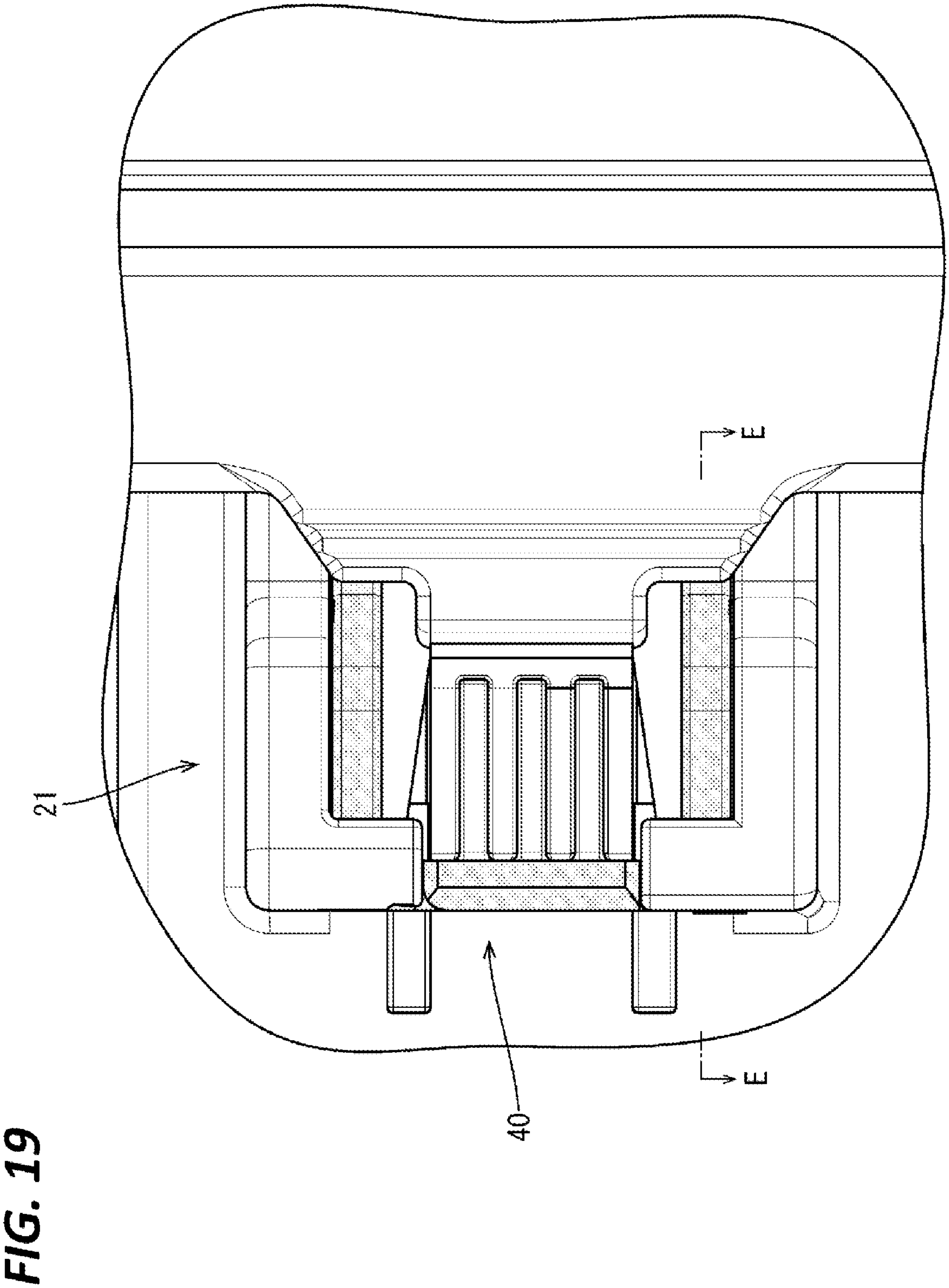
FIG. 19 is a partially enlarged plan view showing a state where the CPA member of the embodiment is at a fitting assurance position.

The entire CPA member 40 is accommodated in the CPA holding portion 21 as shown in FIGS. 18 and 19 when it is at the fitting assurance position. The push-in base portion 41A is arranged between the two standing walls 23A, 23B, and the protruding portion 41B is arranged between the two restricting walls 24A, 24B.

Two-Dimensional Code 50

As shown in FIG. 6, the two-dimensional code 50 is arranged on the first code arrangement surface 22S1 and the second code arrangement surface 41S1. The two-dimensional code 50 is arranged at a position where the push-in base portion 41A and the first restricting wall 24A are adjacent to each other. The two-dimensional code 50 is divided into a first divided code 50A and a second divided code 50B, the first divided code 50A is arranged on the first code arrangement surface 22S1, and the second divided code 50B is arranged on the second code arrangement surface 41S1. As described above, the first code arrangement surface 22S1 and the second code arrangement surface 41S1 are surfaces that are visible from the outside in both the state where the CPA member 40 is at the standby position and the state where the CPA member 40 is at the fitting assurance position, and therefore the first divided code 50A and the second divided code 50B are visible from the outside in both the state where the CPA member 40 is at the standby position and the state where the CPA member 40 is at the fitting assurance position. In this embodiment, the boundary line between the first code arrangement surface 22S1 and the second code arrangement surface 41S1 is located approximately at a central position between the two parallel side edges of the two-dimensional code 50, and the two-dimensional code 50 is divided in two along this boundary line.

When the CPA member 40 is not at the fitting assurance position, as shown in FIG. 6, the first code arrangement surface 22S1 and the second code arrangement surface 41S1 are not flush with each other, and are arranged shifted from each other. For this reason, the first divided code 50A and the second divided code 50B are arranged at positions shifted from each other and do not form the two-dimensional code 50.

Figure 20:
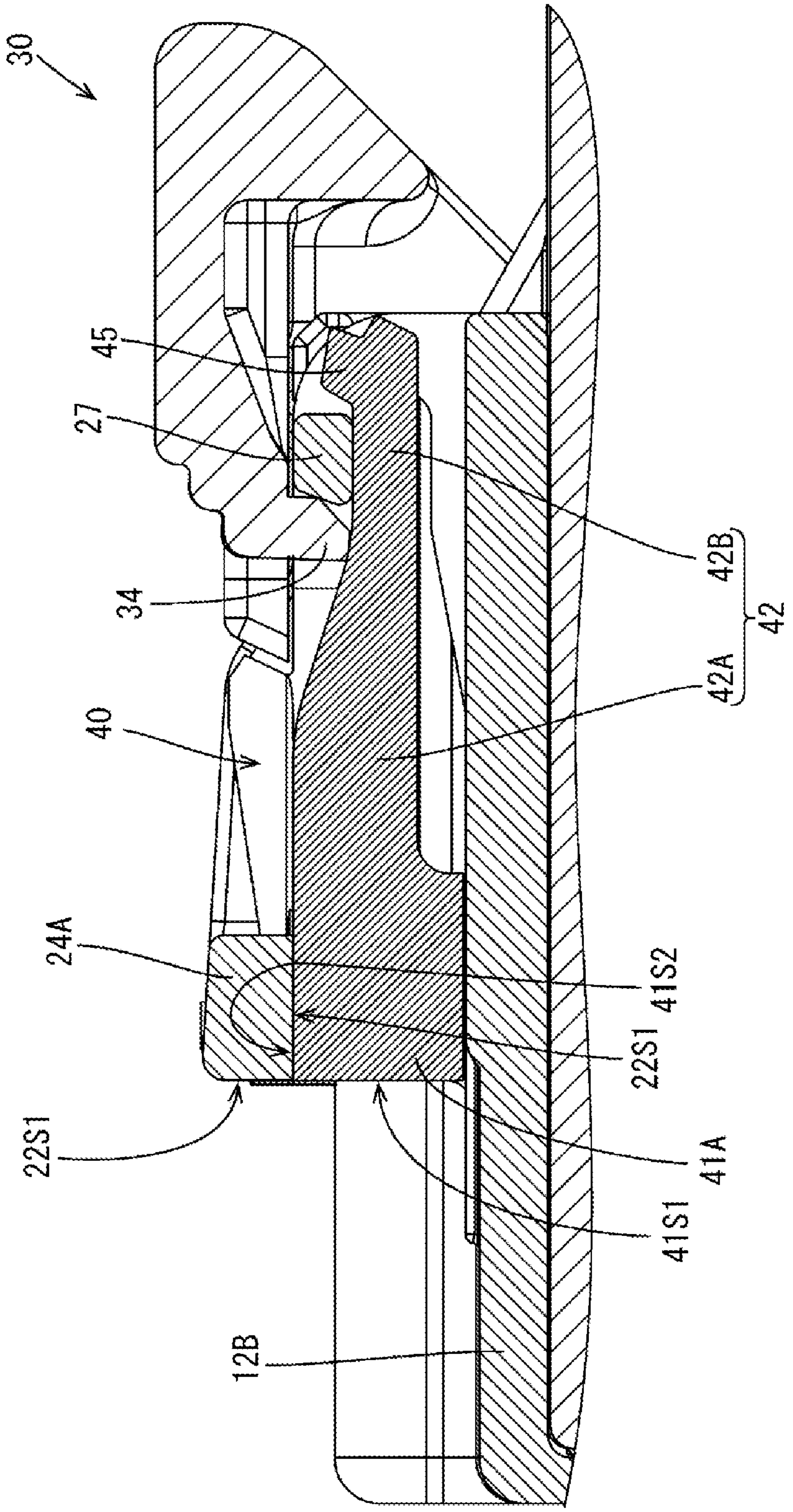
FIG. 20 is a cross-sectional view taken along line E-E of FIG. 19.

When the CPA member 40 is at the fitting assurance position, as shown in FIGS. 18 and 20, the first code arrangement surface 22S1 and the second code arrangement surface 41S1 are flush with each other and adjacent to each other. As a result, the first divided code 50A and the second divided code 50B are adjacent to each other and form the two-dimensional code 50, which can be read by a scanning device.

The two-dimensional code 50 can be formed, for example, by performing laser printing on the surfaces of the first code arrangement surface 22S1 and the second code arrangement surface 41S1 while the CPA member 40 is held at the fitting assurance position.

Partner Connector 60

Figure 12:
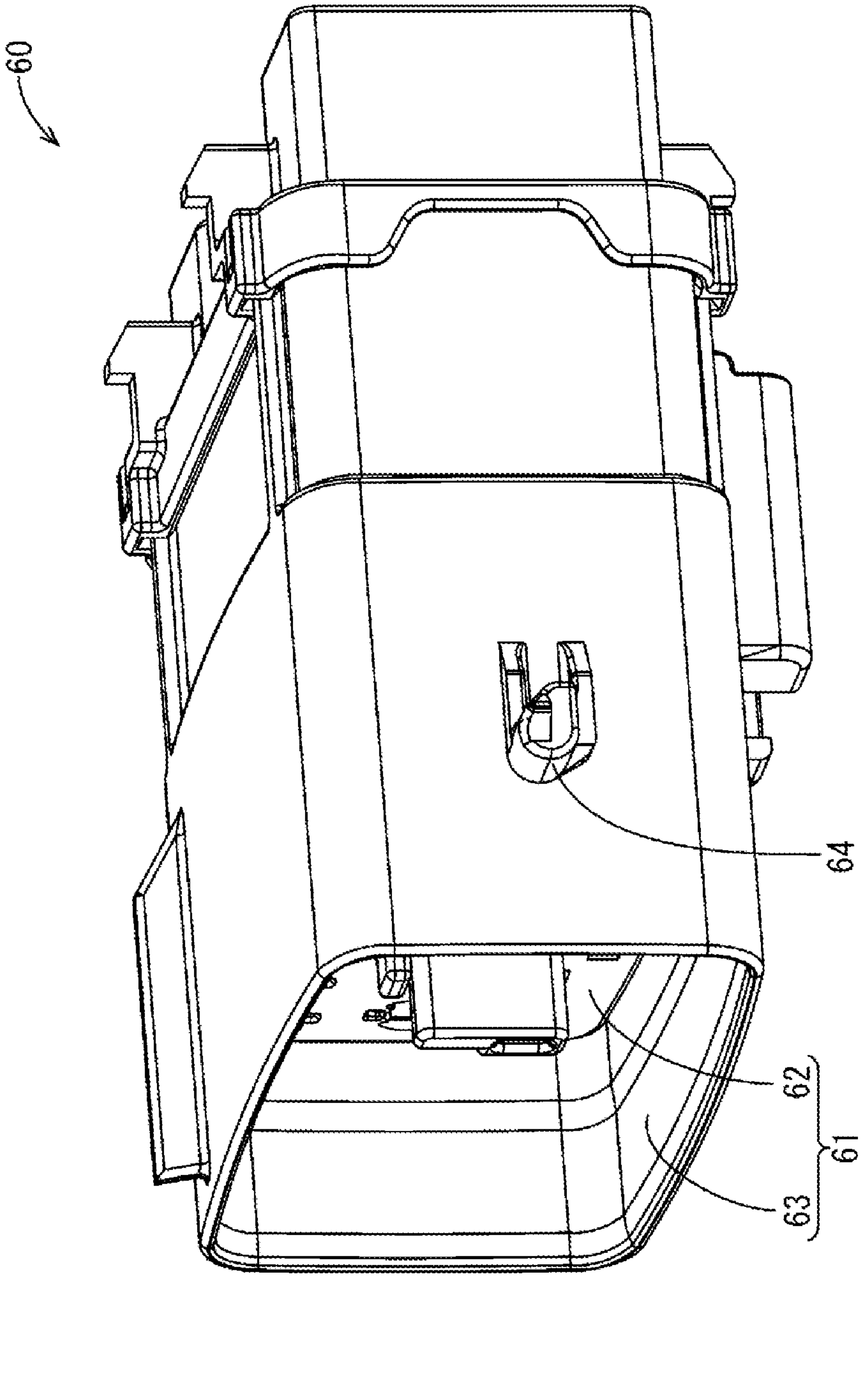
FIG. 12 is a perspective view of a partner connector of the embodiment.

The partner connector 60 is made of synthetic resin, and includes a partner housing 61 and two cam followers 64 arranged on the outer surface of the partner housing 61, as shown in FIG. 12. The partner housing 61 includes a block-shaped second terminal holding portion 62 that holds partner terminal fittings, and a second hood portion 63 that extends from the second terminal holding portion 62, is accommodated inside the first hood portion 12, and is received inside the first terminal holding portion 11.

Fitting Between Lever-Type Connector 1 and Partner Connector 60

When the lever-type connector 1 is not fitted with the partner connector 60, as shown in FIG. 1, the lever 30 is held at the fitting start position and the CPA member 40 is held at the standby position.

When the lever-type connector 1 is engaged with the partner connector 60, the operation of fitting with the partner connector 60 is assisted due to the partner connector 60 being relatively drawn to the connector housing 10 by the cam action between the cam grooves 36 and the cam followers 64 as the lever 30 is rotated from the fitting start position to the fitting completion position.

Figure 13:
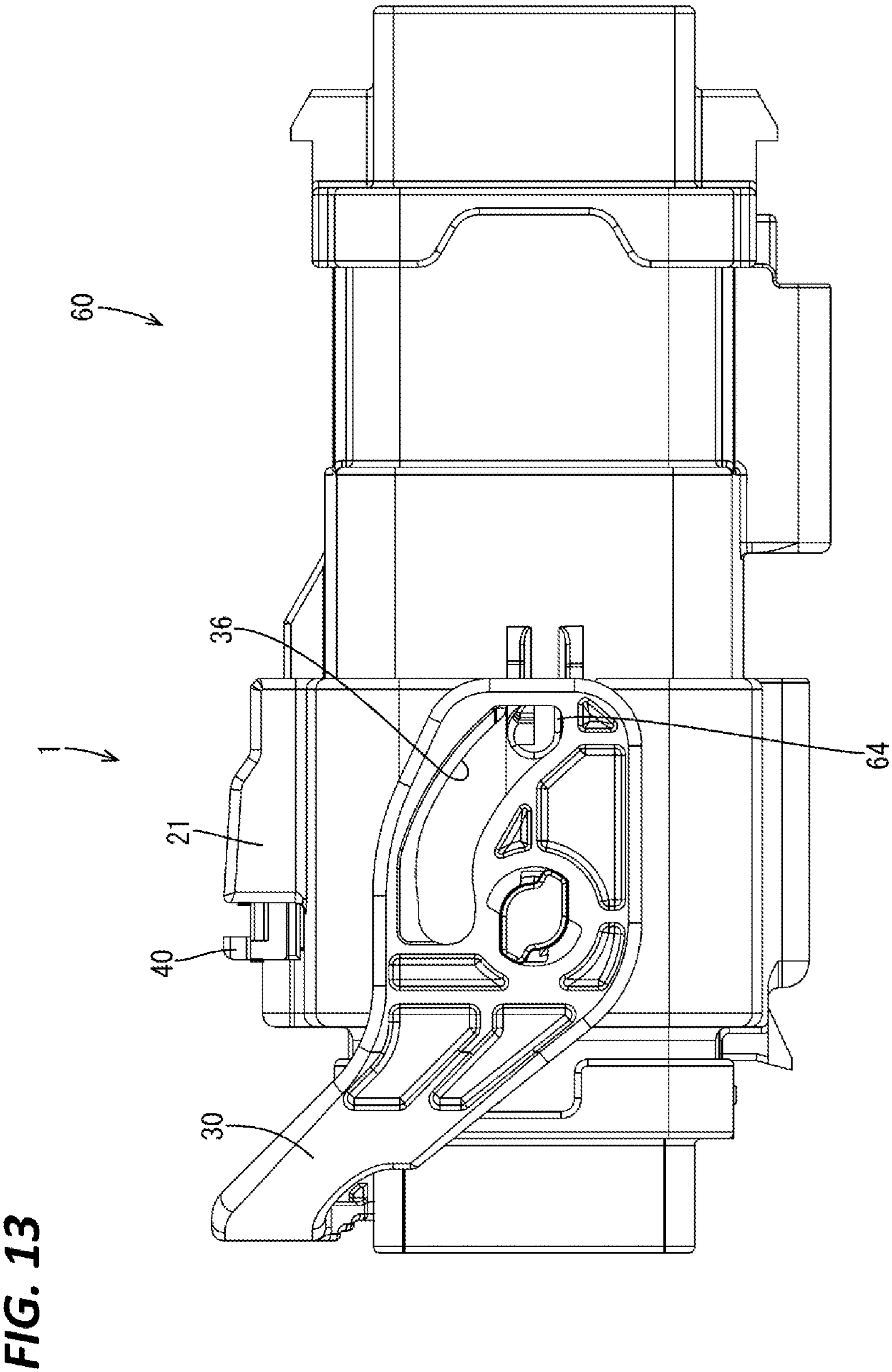
FIG. 13 is a side view showing an initial state of fitting between the lever-type connector and the partner connector of the embodiment.

First, the lever-type connector 1 is shallowly fitted to the partner connector 60. As shown in FIG. 13, the cam followers 64 enter the cam grooves 36.

Figure 14:
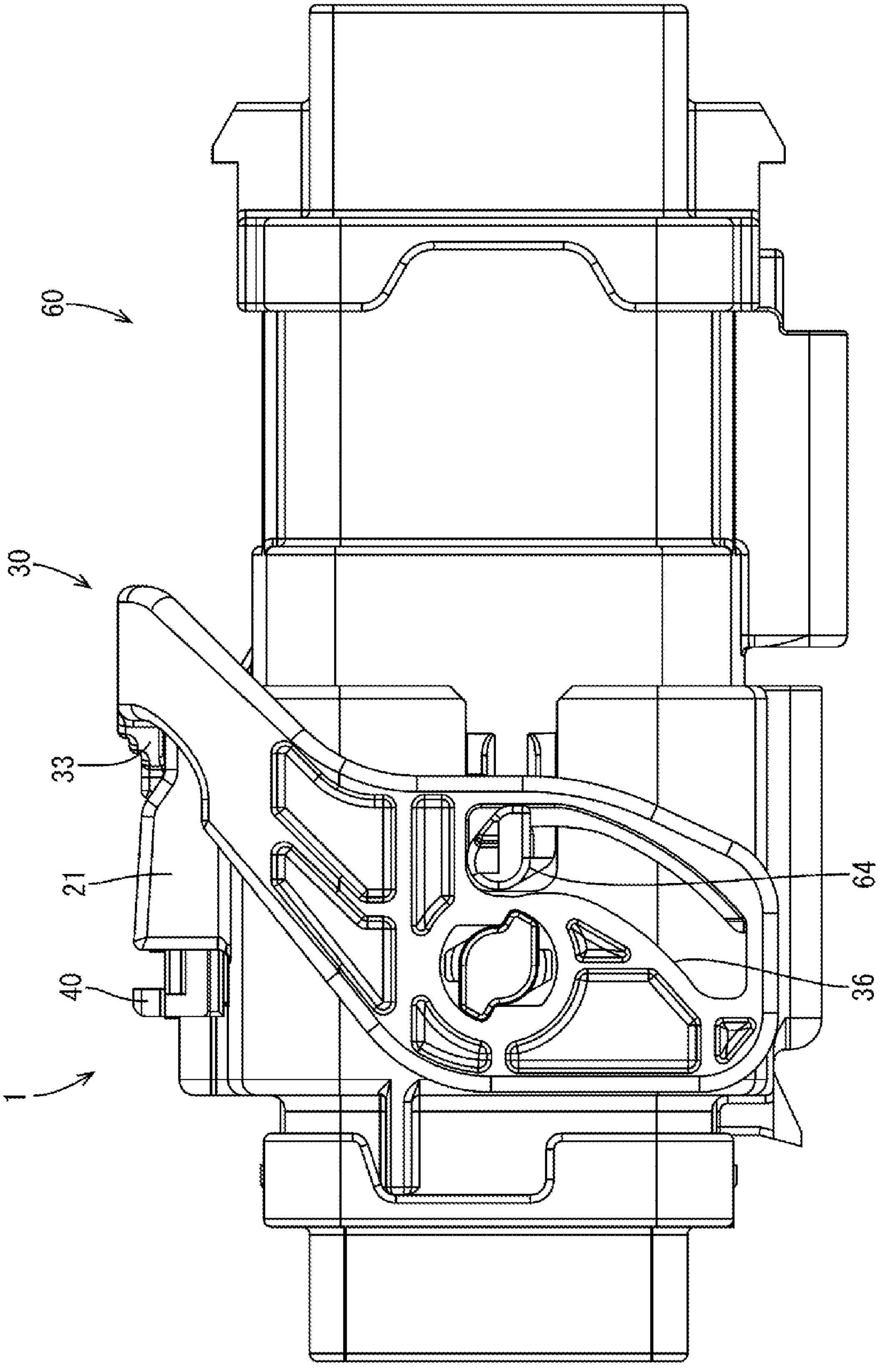
FIG. 14 is a side view showing a state where the fitting between the lever-type connector and the partner connector of the embodiment is complete and the CPA member is at the standby position.
Figure 15:
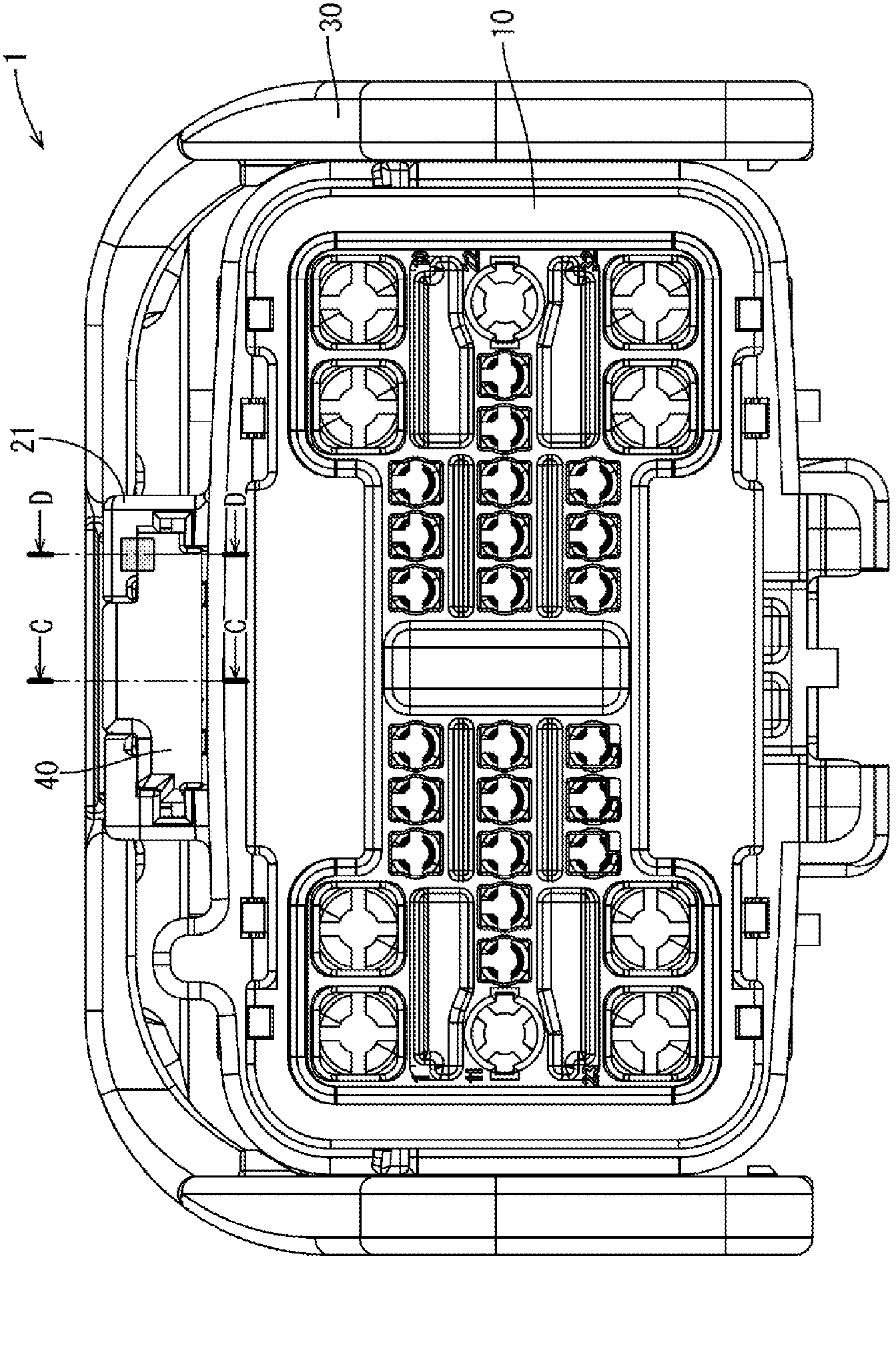
FIG. 15 is a rear view showing a state where the fitting between the lever-type connector and the partner connector of the embodiment is complete and the CPA member is at the standby position.
Figure 16:
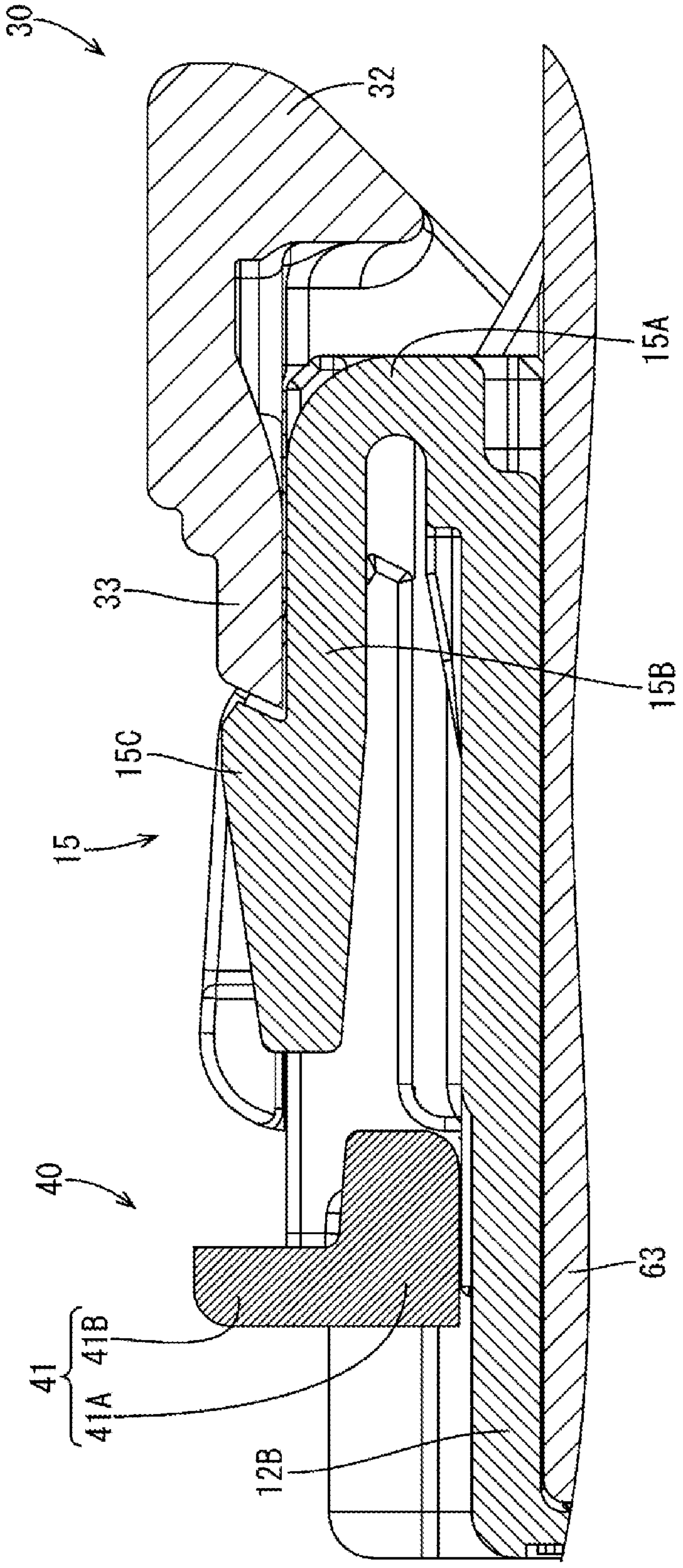
FIG. 16 is a cross-sectional view taken along line C-C of FIG. 15.

Next, the lever 30 is rotated from the fitting start position toward the fitting completion position. As the lever 30 rotates, the connector housing 10 is relatively drawn to the partner connector 60 by the cam action based on the engagement between the cam followers 64 and the cam grooves 36. When the lever 30 approaches the fitting completion position, the lock claw 15C of the lock arm 15 is pushed by the lock portion 33, whereby the lock plate 15B bends toward the lock wall 12B. When the lever 30 reaches the fitting completion position, as shown in FIG. 14, the connector housing 10 reaches the proper fitting position with respect to the partner connector 60. Also, as shown in FIG. 16, the lock portion 33 goes past the lock claw 15C, the lock arm 15 is elastically restored, and the lock portion 33 is arranged along the lock arm 15. The leading end of the lock portion 33 is engaged with the lock claw 15C, whereby the lever 30 is held at the fitting completion position.

Figure 17:
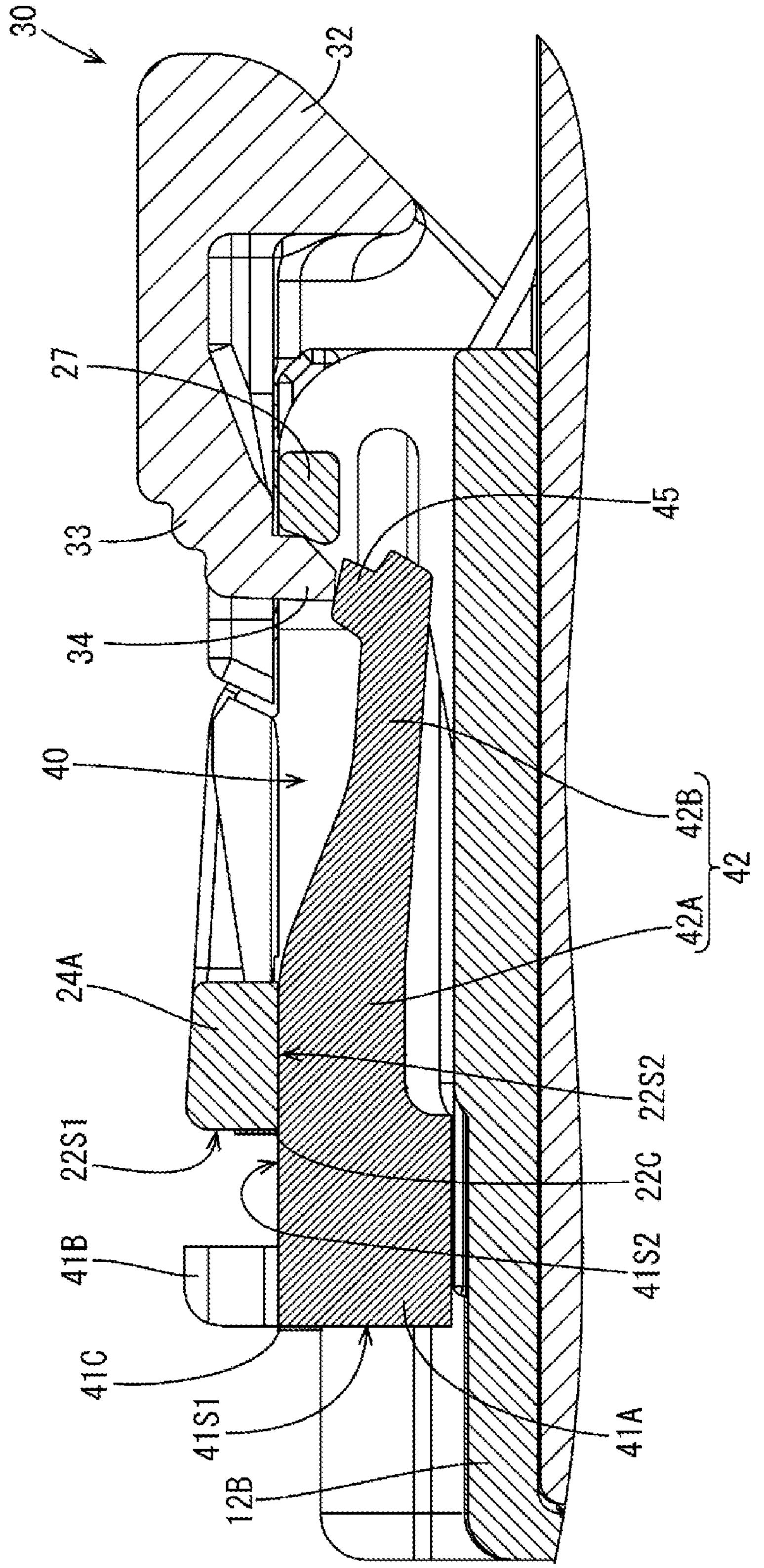
FIG. 17 is a cross-sectional view taken along line D-D of FIG. 15.

When the lever 30 reaches the fitting completion position, as shown in FIG. 17, the two release protrusions 34 enter between each of the two side walls 26 and the lock arm 15, and respectively press the two second restriction protrusions 45. As a result, the bending portion 42B bends toward the lock wall 12B, and the second restricting protrusions 45 can pass through the spaces between the first restricting protrusions 27 and the lock wall 12B. As a result, the CPA member 40 can be pushed in from the standby position to the fitting assurance position. By contrast, when the lever 30 has not reached the fitting completion position, the release protrusions 34 do not press the second restricting protrusions 45, and therefore the first restricting protrusion 27 interferes with the second restricting protrusions 45 and the CPA member 40 cannot be pushed into the fitting assurance position (see FIG. 11). In this manner, depending on whether or not the CPA member 40 can be pushed into the fitting assurance position, it is possible to determine whether or not the lever 30 has been rotated to the fitting completion position and the lever-type connector 1 and the partner connector 60 have reached the proper fitting position.

After the lever 30 is housed at the fitting completion position, as shown in FIGS. 18 and 19, the CPA member 40 is pushed in from the standby position to the fitting assurance position. When the CPA member 40 reaches the fitting assurance position, as shown in FIG. 20, the second restricting protrusions 45 pass between the first restricting protrusions 27 and the lock wall 12B, the bending portion 42B is elastically restored, and the second restricting protrusions 45 engage with the first restricting protrusions 27, whereby the CPA member 40 is restricted from moving to the standby position and is held at the fitting assurance position.

As shown in FIGS. 18 and 20, when the CPA member 40 is at the fitting completion position, the first code arrangement surface 22S1 and the second code arrangement surface 41S1 are flush with each other and adjacent to each other, and the first divided code 50A and the second divided code 50B are adjacent to each other to form one two-dimensional code 50. By reading this two-dimensional code 50 with a scanning device, completion of fitting is recorded in a recording device.

Here, as shown in FIGS. 17 and 20, in the first restricting wall 24A, a first corner portion 22C constituted by the first code arrangement surface 22S1 and a first opposing surface 22S2 that is adjacent to the first code arrangement surface 2251 and opposes the push-in base portion 41A has an angular shape without roundness. Similarly, in the push-in base portion 41A, a second corner portion 41C constituted by the second code arrangement surface 41S1 and a second opposing surface 41S2 that is adjacent to the second code arrangement surface 41S1 and opposes the first opposing surface 22S2 has an angular shape without roundness. When the CPA member 40 is at the fitting assurance position, as shown in FIG. 20, the first opposing surface 22S2 and the second opposing surface 41S2 are in contact with each other, and in a region where the first divided code 50A and the second divided code 50B are arranged, the first code arrangement surface 22S1 and the second code arrangement surface 41S1 are adjacent to each other without any gap. Then, as shown in FIG. 18, the first divided code 50A and the second divided code 50B are adjacent to each other without any gap and form the two-dimensional code 50. As a result, the two-dimensional code 50 can be reliably read.

When the CPA member 40 is at the fitting assurance position, as shown in FIG. 20, due to the second restricting protrusions 45 engaging with the first restricting protrusions 27, the CPA member 40 is restricted from rattling in the direction of sliding to the standby position with respect to the CPA holding portion 21, and the first divided code 50A and the second divided code 50B are prevented from being shifted from each other. This avoids a situation in which the two divided codes 50A and 50B are misaligned and the two-dimensional code 50 cannot be read even though the CPA member 40 is at the fitting assurance position.

Operations and Effects

As described above, according to the present embodiment, the lever-type connector 1 includes: a connector housing 10 that can fit with a partner connector 60; a lever 30 that is attached to the connector housing 10 so as to be rotatable from the fitting start position to the fitting completion position; a CPA holding portion 21 that is provided on one of the connector housing 10 and the lever 30 and has a first code arrangement surface 22S1; a CPA member 40 that is attached to the CPA holding portion 21, can be displaced from a standby position to a fitting assurance position when the lever 30 is at a fitting completion position, and has a second code arrangement surface 41S1 that is arranged on the same plane as the first code arrangement surface 22S1 when at the fitting assurance position 40; a first divided code 50A arranged on the first code arrangement surface 22S1; and a second divided code 50B arranged on the second code arrangement surface 41S1, in which the first divided code 50A and the second divided code 50B are adjacent to each other and form the two-dimensional code 50 when the CPA member 40 is at the fitting assurance position.

According to the above-described configuration, since the two-dimensional code 50 can be read when the CPA member 40 is at the fitting assurance position, it is possible to accurately record that the lever-type connector 1 has been properly fitted with the partner connector 60.

Both the first code arrangement surface 22S1 and the second code arrangement surface 41S1 are surfaces that are visible from the outside in both the state where the CPA member 40 is at the standby position and the state where the CPA member 40 is at the fitting assurance position.

According to such a configuration, the first divided code 50A arranged on the first code arrangement surface 22S1 and the second divided code 50B arranged on the second code arrangement surface 41S1 are always visible, and therefore by visually confirming whether or not the positions of the first divided code 50A and the second divided code 50B are shifted from each other, it is possible to determine whether or not the fitting between the lever-type connector 1 and the partner connector 60 is complete, and it is possible to more smoothly perform the fitting operation between the lever-type connector 1 and the partner connector 60.

Also, the CPA holding portion 21 includes the first restricting protrusion 27, and the CPA member 40 includes a second restricting protrusion 45 that restricts displacement of the CPA member 40 from the fitting assurance position to the standby position by engaging with the first restricting protrusion 27.

According to such a configuration, the CPA member 40 is prevented from rattling in the direction of moving to the standby position with respect to the CPA holding portion 21, and the first divided code 50A and the second divided code 50B are prevented from being misaligned with respect to each other. This avoids a situation in which the two-dimensional code 50 cannot be read even though the lever 30 is at the fitting completion position.

Also, the CPA holding portion 21 has the first corner portion 22C formed by the first code arrangement surface 22S1 and the first opposing surface 22S2 adjacent to the first code arrangement surface 22S1, the first corner portion 22C having an angular shape, and the CPA member 40 has the second corner portion 41C formed by the second code arrangement surface 41S1 and the second opposing surface 41S2 that is adjacent to the second code arrangement surface 4151 and comes into contact with the first opposing surface 22S2 when the CPA member 40 is at the engagement assurance position, the second corner portion 41C having an angular shape.

According to such a configuration, when the CPA member 40 is at the fitting assurance position, the first code arrangement surface 22S1 and the second code arrangement surface 41S1 are adjacent to each other without any gap, and therefore the first divided code 50A and the second divided code 50B are adjacent to each other without any gap and form the two-dimensional code 50. This makes it possible to reliably read the two-dimensional code 50.

Other Embodiments (1) In the above embodiment, the CPA holding portion 21 was provided on the connector housing 10, but the holding portion may also be provided on the lever.

(2) In the above embodiment, the two-dimensional code was formed by laser printing, but seals on which the first divided code and the second divided code are printed may also be respectively adhered to the first code arrangement surface and the second code arrangement surface.

(3) In the above-described embodiment, the two-dimensional code 50 was divided into two at approximately the central position between two side edges parallel to each other, but there is no particular limitation on the division position of the two-dimensional code, and the two-dimensional code may also be divided at any position according to the shape or the like of the part where the two-dimensional code is arranged.

LIST OF REFERENCE NUMERALS

1 Lever-type connector
10 Connector housing
11 First terminal holding portion
12 First hood portion
12A Attachment wall
12B Lock wall
12C Connector entry port
12S Attachment surface
13 Receiving groove
14 Rotation shaft
15 Lock arm
15A Lock base portion
15B Lock plate
15C Lock claw
21 CPA holding portion (holding portion)
22 Insertion wall portion
22C First corner portion
22S1 First code arrangement surface
22S2 First opposing surface
23A First standing wall
23B Second standing wall
24A First restricting wall
24B Second restricting wall
25 CPA insertion port
26 Side wall
27 First restricting protrusion (restricting portion)
28 Guide groove
29 First locking protrusion
30 Lever
31 Cam plate
32 Rotation operation portion
33 Lock portion
34 Release protrusion
35 Shaft hole
36 Cam groove
36A Cam entry port
40 CPA member (fitting assurance member)
41 Push-in operation portion
41A Push-in base portion
41B Protruding portion
41C Second corner portion
41S1 Second code arrangement surface
41S2 Second opposing surface
42 Arm
42A Arm base portion
42B Bending portion
43 Guide rib
44 Second locking protrusion
45 Second restricting protrusion (restriction receiving portion)
50 Two-dimensional code
50A First divided code
50B Second divided code
60 Partner connector
61 Partner housing
62 Second terminal holding portion
63 Second hood portion
64 Cam follower

What is claimed is:

1. A lever-type connector comprising:
a connector housing capable of fitting with a partner connector;
a lever configured to be attached so as to be rotatable from a fitting start position to a fitting completion position with respect to the connector housing;
a holding portion provided on one of the connector housing and the lever and having a first code arrangement surface;
a fitting assurance member that is attached to the holding portion, is displaceable from a standby position to a fitting assurance position when the lever is at the fitting completion position, and has a second code arrangement surface arranged on the same plane as the first code arrangement surface when the fitting assurance member is at the fitting assurance position;
a first divided code arranged on the first code arrangement surface; and
a second divided code arranged on the second code arrangement surface,
wherein the second code arrangement surface and the first code arrangement surface are each arranged on a different plane when the fitting assurance member is not at the fitting assurance position, and
wherein, when the fitting assurance member is at the fitting assurance position, the first divided code and the second divided code are adjacent to each other and form a two-dimensional code.

2. The lever-type connector according to claim 1, wherein both the first code arrangement surface and the second code arrangement surface are surfaces visible from the outside in both a state where the fitting assurance member is at the standby position and a state where the fitting assurance member is at the fitting assurance position.

3. The lever-type connector according to claim 1, wherein one of the holding portion and the fitting assurance member includes a restricting portion, and the other includes a restriction receiving portion for restricting displacement of the engagement assurance member from the fitting assurance position to the standby position by engaging with the restricting portion.

4. The lever-type connector according to claim 1, wherein
the holding portion includes a first corner portion formed by the first code arrangement surface and a first opposing surface adjacent to the first code arrangement surface, the first corner portion having an angular shape, and
the fitting assurance member includes a second corner portion formed by the second code arrangement surface and a second opposing surface that is adjacent to the second code arrangement surface and is configured to come into contact with the first opposing surface when the fitting assurance member is at the fitting assurance position, the second corner portion having an angular shape.

5. The lever-type connector according to claim 1,
wherein the holding portion includes a first opposing surface that is adjacent to the first code arrangement surface, and
wherein the fitting assurance member includes a second opposing surface that is adjacent to the second code arrangement surface and is configured to face the first opposing surface with no interceding gap when the fitting assurance member is at either of the standby position or the fitting assurance position.

6. The lever-type connector according to claim 1, wherein the fitting assurance member includes a push-in operation portion and two arms respectively extending from opposite ends of the push-in operation portion, wherein the push-in operation portion includes a push-in base portion arranged along a lock wall of the connector housing and a protruding portion protruding from the push-in base portion in a direction away from the lock wall, and wherein the second code arrangement surface is arranged perpendicular to the lock wall and is formed on an outwardly disposed portion of the push-in operation portion corresponding to one of the opposite ends.

7. The lever-type connector according to claim 6, wherein the holding portion includes a first standing wall and a second standing wall respectively arranged on opposite ends of the holding portion, a first restricting wall that extends from the first standing wall toward the second standing wall, and a second restricting wall extending from the second standing wall toward the first standing wall, and wherein the fitting assurance member is entirely accommodated in the holding portion when the fitting assurance member is at the fitting assurance position such that the push-in base portion is arranged between the two standing walls and the protruding portion is arranged between the two restricting walls.

8. The lever-type connector according to claim 1, wherein the holding portion includes an insertion wall portion arranged so as to face toward the fitting assurance member in the standby position, two side walls that extend from the insertion wall portion and are respectively arranged on opposite sides of the holding portion, and two guide grooves respectively formed on an inner side of the two side walls, and wherein the fitting assurance member includes two arms respectively extending from opposite ends of the fitting assurance member, the two arms configured to engage with the two guide grooves such that the fitting assurance member slides between the standby position and the fitting assurance position until the fitting assurance member is entirely accommodated in the holding portion.

* * * * *